No. 641,717. Patented Jan. 23, 1900.
W. V. MILLER & E. B. DUNN.
WEB FEEDING MECHANISM.
(Application filed Dec. 31, 1898.)
(No Model.) 3 Sheets—Sheet 1.
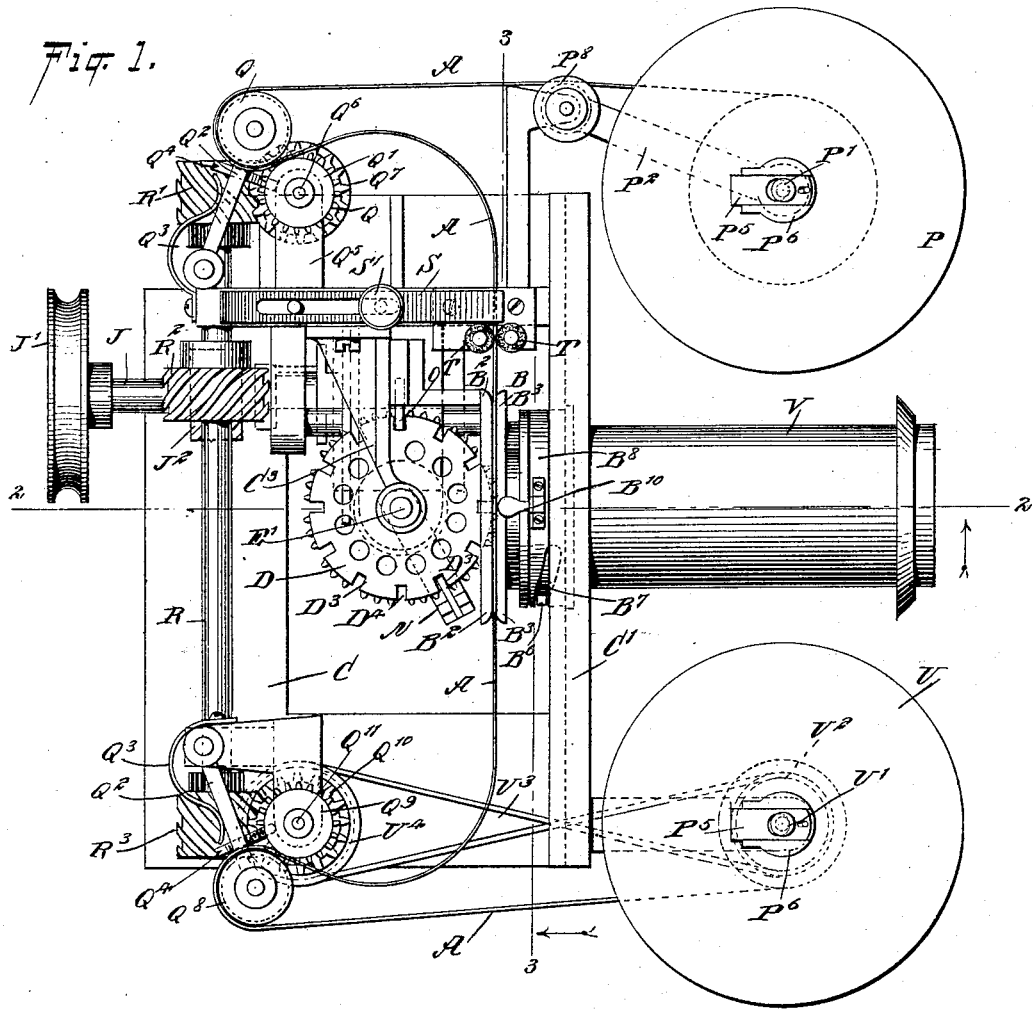
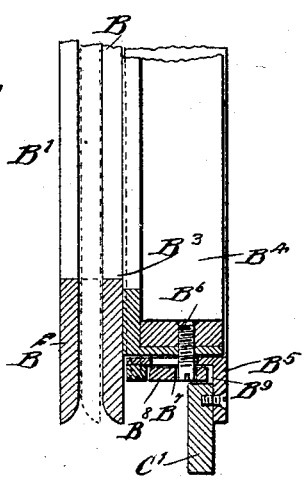
WITNESSES:
INVENTORS
ATTORNEYS.

No. 641,717.  
Patented Jan. 23, 1900.  
W. V. MILLER & E. B. DUNN.  
WEB FEEDING MECHANISM.  
(Application filed Dec. 31, 1898.)  
(No Model.)  
3 Sheets—Sheet 2.

WITNESSES:  
INVENTORS  
ATTORNEYS.

No. 641,717. Patented Jan. 23, 1900.
W. V. MILLER & E. B. DUNN.
WEB FEEDING MECHANISM.
(Application filed Dec. 31, 1898.)
(No Model.) 3 Sheets—Sheet 3.
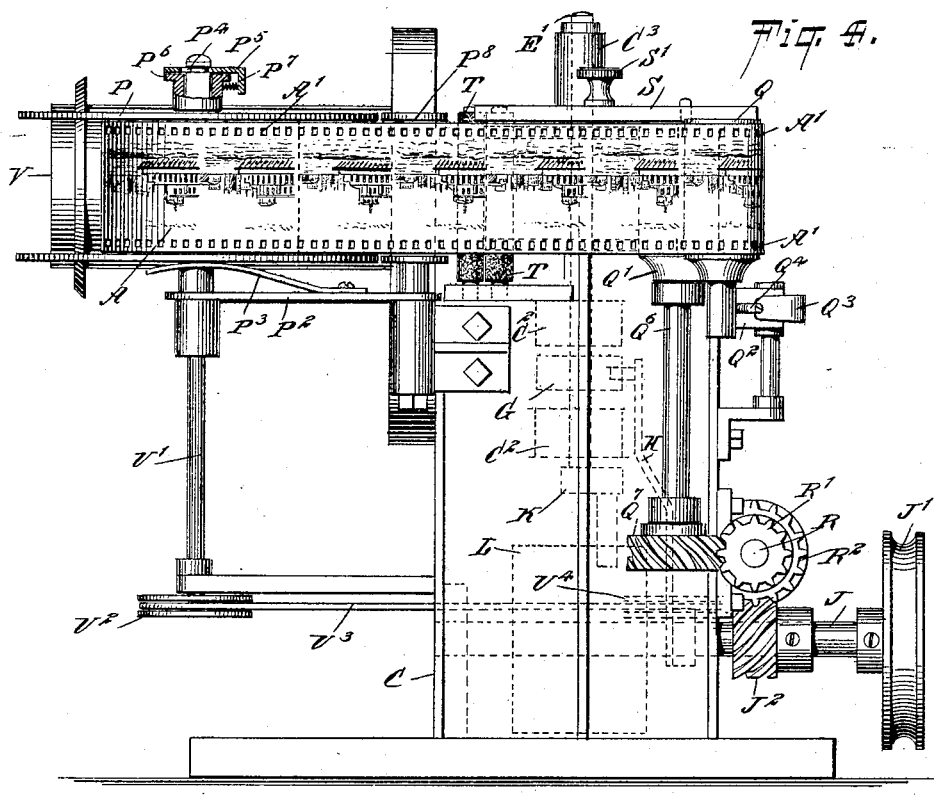
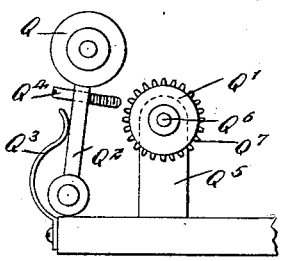
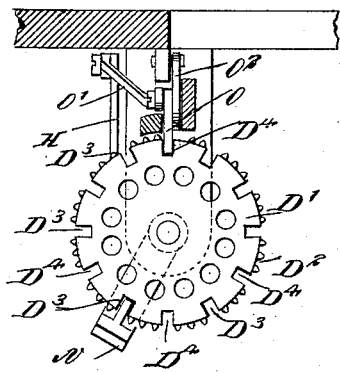

UNITED STATES PATENT OFFICE.

WILLIAM V. MILLER AND ELIAS B. DUNN, OF NEW YORK, N. Y., ASSIGNORS OF ONE-THIRD TO GERTRUDE PRINCE COOMBS, OF SAME PLACE.

WEB-FEEDING MECHANISM.

SPECIFICATION forming part of Letters Patent No. 641,717, dated January 23, 1900.

Application filed December 31, 1898. Serial No. 700,849. (No model.)

*To all whom it may concern:*

Be it known that we, WILLIAM V. MILLER and ELIAS B. DUNN, of the city of New York, borough of Brooklyn, in the county of Kings and State of New York, have invented a new and Improved Web-Feeding Mechanism, of which the following is a full, clear, and exact description.

The invention relates to photographic projecting-machines such as shown and described in Letters Patent No. 623,410 to William Vellette Miller and George P. Rice, dated April 18, 1899.

The object of the invention is to provide a new and improved web-feeding mechanism arranged to feed a web or film intermittently for projecting photographic pictures upon a screen, the arrangement being such that the pictures obtained are perfect in every respect and when viewed on the screen the moving objects appear natural and are not clouded or unduly vibrated, as is so frequently the case with apparatus heretofore constructed for the purpose.

The invention consists of novel features and parts and combinations of the same, as will be fully described hereinafter and then pointed out in the claims.

A practical embodiment of our invention is represented in the accompanying drawings, forming a part of this specification, in which similar characters of reference indicate corresponding parts in all the views.

Figure 2:
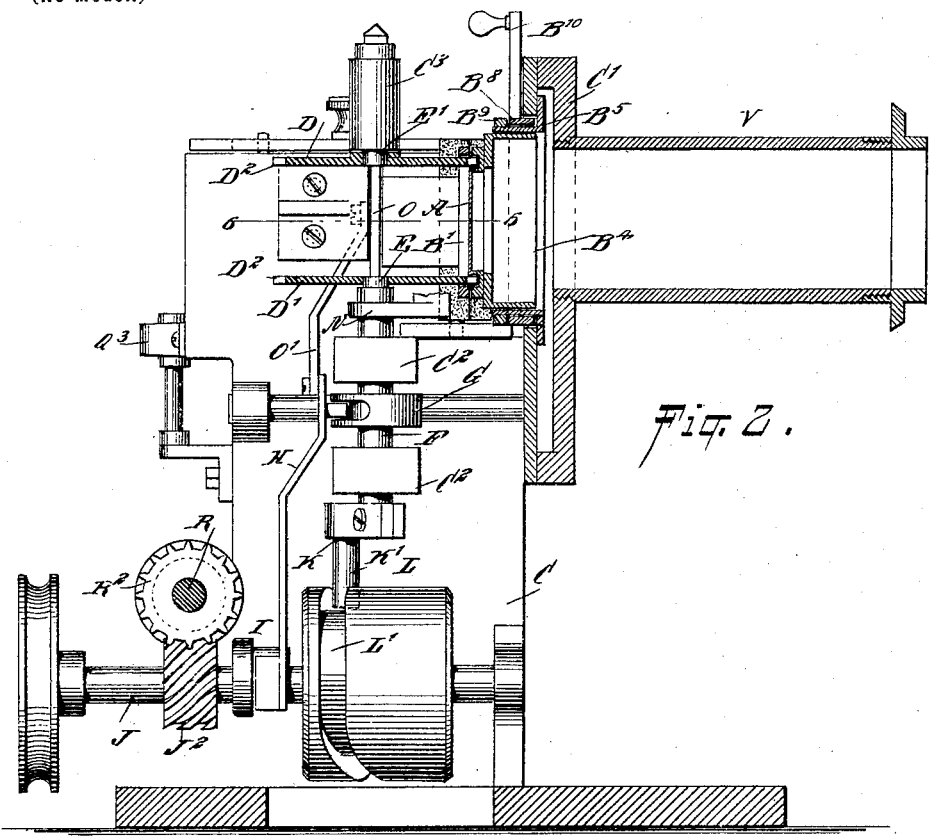
Figure 3:
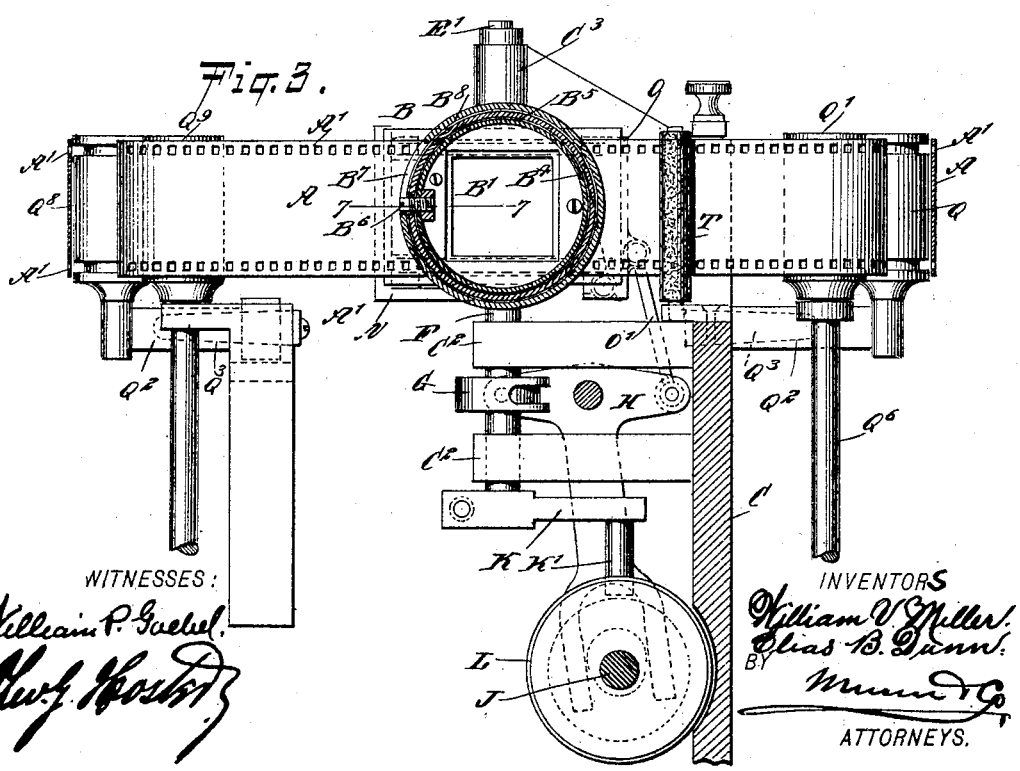

Figure 1 is a plan view of the improvement arranged as a projecting-machine. Fig. 2 is a sectional side elevation of the same on the line 2 2 in Fig. 1. Fig. 3 is a cross-section of the same on the line 3 3 in Fig. 1. Fig. 4 is a rear elevation of the same. Fig. 5 is a detail plan view of the tension device for the web. Fig. 6 is a sectional plan view of part of the web-feeding wheels and adjacent parts, the section being on the line 6 6 in Fig. 2; and Fig. 7 is an enlarged sectional plan view of the slide and adjacent parts, the section being on the line 7 7 in Fig. 3.

In an apparatus of the class described the photographic pictures on a web or film follow each other in such rapid succession that when the pictures appear successively on the screen the observer cannot very well distinguish between succeeding ones, and consequently gets the impression of actual motion of the depicted objects. In machines of the class described and as heretofore constructed the web or film is passed in a vertical direction to and past the slide-opening and the web or film has the photographic pictures located one above the other. Now when the pictures pass in rapid succession through the field of the apparatus and appear on the screen then the high lights of one picture appear passing over the dark portions of the preceding pictures until full registry is again had of the picture in the slide-opening during the period of rest, and consequently the picture appears blurred and dimmed and does not appear very distinct to the eye of the observer. This is especially the case with pictures having the objects moving in a longitudinal direction—say a ferryboat on the water with a sky above and a suitable background. In this case the vertical movement of the film and the longitudinal movement of the ferry-boat prevent proper blending of succeeding pictures, and the whole appears unnatural to the observer. Furthermore, the dark-appearing water in one picture appears as passing through the sky and high lights of the preceding picture. With our arrangement, presently to be described in detail, the web or picture-strip is set on edge and moves horizontally and intermittently past the slide-opening in the apparatus, the pictures being arranged one alongside the other, so that the high lights always remain in register and the web moves in the same direction as the depicted objects, and consequently the pictures appear more natural and exceedingly bright, especially in the case mentioned, in which the objects appear continuous and in the same line of movement as the web itself and without the dark-appearing water of one picture passing through the sky and high lights of the preceding picture.

The film A, made in the form of a continuous sheet, is provided with photographic pictures arranged one alongside the other, as above described, and said film is also provided near the top and bottom edges with the usual equidistant apertures A', adapted to be engaged by the feed mechanism, as hereinafter more fully described, for imparting an intermittent traveling motion to the film through a slide B, having an opening B' in the field of the lens to project a picture on a screen or for making exposures of a sensitive film in the usual manner. The slide B is arranged horizontally for the film A to travel in a similar direction with the slide, the film standing on edge, as is plainly indicated in the drawings.

The slide B is provided with a fixed member $B^2$, supported from the main frame C, and a movable member $B^3$, adapted to be moved toward or from the fixed member $B^2$ to permit of readily placing the film in position in the slide and adjusting the slide members relatively to each other, according to the thickness of the film. The movable member $B^3$ of the slide is secured on or formed with a ring $B^4$, mounted to slide in a tube $B^5$, having a flange screwed or otherwise fastened to a carrier C', forming part of the main frame C, said carrier also supporting the lens-tube V, the opening of which is in alinement with the opening B' of the slide B. On the ring $B^4$ is secured a pin $B^6$, projecting through a spirally-arranged slot $B^7$ in a ring $B^8$, mounted to turn on a bearing $B^9$, arranged externally on the tube $B^5$, said ring $B^8$ being held in said bearing against longitudinal movement, but the ring being free to turn in the bearing by means of a handle $B^{10}$. The pin $B^6$ also projects through a slot in the tube $B^5$, as indicated in Fig. 7. When the handle $B^{10}$ is turned in one direction, the wall of the spiral slot $B^7$ moves the pin $B^6$ to one side, so as to move the ring $B^4$ and the slide member $B^3$ in the same direction, and when the handle $B^{10}$ is turned in the opposite direction the slide member $B^3$ is moved in the opposite direction—that is, toward or from the fixed member $B^2$—according to the direction in which the handle is turned. When the several parts are in the position shown in Fig. 7, then the two members $B^2$ and $B^3$ are spaced sufficiently apart to permit the ready insertion of the film, and when this has been done the handle $B^{10}$ is turned to move the member $B^3$ toward the fixed member $B^2$ and hold the film against wabbling in the slide, but to slide with the same in a transverse direction and while on edge.

The feed mechanism is substantially the same in construction as the one described in the application for Letters Patent of the United States above referred to—that is, the said feed mechanism is provided with wheels D D', arranged horizontally and placed a suitable distance apart and formed with peripheral sprockets $D^2$, adapted to engage the apertures A' of the film A at the top and bottom of the slide-opening B', said wheels D and D' rotating intermittently in unison, so as to impart an intermittent traveling motion to the film and bring successive spaces of the film into the opening B', and consequently into the field of the lens or other device. The sprockets $D^2$ pass through suitable recesses in the slide members $B^2$ and $B^3$, as plainly indicated in Fig. 2. The feed-wheels D D' leave a clear space between their opposing faces for the uninterrupted passage of the light to and through the slide-opening B', the wheel D' being secured to a shaft E, mounted to turn in a hollow shaft F, journaled in suitable bearings $C^2$, attached to the main frame C. The other wheel D is secured on a shaft E', mounted to turn in a bearing $C^3$, held on the frame C. The two shafts E E' are in axial alinement with each other, but extend in opposite directions from the wheels D D', so as to leave a clear space between the opposing faces of the wheels for the purpose mentioned.

The hollow shaft F is mounted to turn and to slide in the bearings $C^2$, the sliding motion being imparted to the shaft by means of a cam G on a sleeve engaged by a three-armed lever H, receiving an intermittent swinging motion from a cam I on the main driving-shaft J, rotated either by hand by applying a crank-arm on the shaft or by power from a pulley J' and a belt driven from other machinery. An intermittent turning or rocking motion is given to the hollow shaft by means of an arm K, having a friction-roller K', engaging the cam-groove L' of a cam L, secured on said shaft J. The mechanism for imparting the turning and sliding motion to the hollow shaft is substantially the same as described in the application referred to.

On the upper end of the hollow shaft F, adjacent to the wheel D', is secured an L-shaped toothed arm N, adapted to engage registering notches $D^3$, formed in the peripheral surfaces of the wheels D and D'. As shown in Figs. 1 and 6, six such registering notches $D^3$ are provided; but it is evident that a larger or smaller number of such notches may be employed, according to the length of the picture on the film, it being understood that the arm N engages with its teeth a pair of registering notches and then swings and turns the wheels D and D' one-sixth of a revolution at a time to feed the film in the slide B a corresponding distance—that is, the length of a picture—so as to bring successive pictures into the opening B'. The wheels D and D' are further provided with registering notches $D^4$ intermediate of the notches $D^3$, and adapted to be engaged by a toothed locking-bolt O, connected by a link O' with the three-armed lever H, the bolt being hung on a link $O^2$, pivoted to the frame, as indicated in Fig. 6. By the arrangement described the arm N and the bolt O simultaneously receive motion when the shaft J is rotated for moving the teeth of the arm N in mesh with a pair of notches $D^3$ at the time the teeth of the bolt O move out of engagement with a pair of registering notches $D^4$, and a reverse movement takes place upon a further rotation of the shaft J—that is, the teeth of the arm N move out of engagement with the notches $D^3$ and the teeth of the bolt O move in engagement with the notches $D^4$ to lock the wheels D D' against rotation at the time the arm N is out of engagement with said wheels. As the movement of the arm N and that of the bolt O takes place at the same time, it is evident that the wheels D D' are positively locked against rotation during the period of rest, principally, however, by the bolt O, assisted by the arm N, prior to the beginning of the oscillating motion of the arm N and at the end of said movement. It is understood that when the machine is in motion the cam L by its connection with the hollow shaft F imparts a rocking motion to the latter and to the arm N, and the other cam I by its connection with the hollow shaft F causes the same to slide up and down in such a manner that the oscillating and sliding movements alternate.

We prefer to have two sets of notches $D^3$ and $D^4$, one for the moving arm N and the other for the locking-bolt O, so as to reduce wear on the wheels to a minimum.

The web or film A unwinds from a reel P, mounted to turn loosely on a spindle P', carried by an arm $P^2$, secured on the main frame C. The bottom of the reel P rests on the free end of a spring $P^3$, as is plainly indicated in Fig. 4, and the top of said reel abuts against a head $P^6$, adapted to be locked to the spindle P' by a locking-plate $P^5$, fitted to slide on the head and having an elongated groove fitting over the spindle, one wall of the groove being arranged to engage an annular notch $P^4$, formed near the upper end of the spindle P'. A spring $P^7$ presses on the locking-plate $P^5$ to hold the same normally in engagement with the spindle to lock the head $P^6$ in position; but when it is desired to remove the reel the operator presses the locking-plate $P^5$ against the tension of the spring $P^7$ to disengage the plate from the notch $P^4$ and to permit of sliding the head $P^6$, with the reel, over the spindle P'. The film or web A after leaving the reel P passes over a flanged guide-roller $P^8$, (see Figs. 1 and 4,) to then pass around a pressing-roller Q, which serves to press the film in contact with a sprocket feed-wheel Q', driven from the main shaft J, as hereinafter more fully described, so that when the machine is in operation the feed-wheel Q' pulls on the film and unwinds the same from the reel P. The pressing-roller Q is journaled on an arm $Q^2$, pivoted on the main frame and pressed on by a spring $Q^3$ to cause the roller to press the film with the desired tension upon the sprocket-wheel Q'. A screw $Q^4$ in the arm $Q^2$ serves to limit the inward swinging motion of the said arm, the screw abutting against one of the brackets $Q^5$, in which the shaft $Q^6$ of the feed-roller Q' is journaled.

On the shaft $Q^6$ is secured a gear-wheel $Q^7$, in mesh with a gear-wheel R', secured on a transversely-extending shaft R, journaled in suitable bearings on the main frame C and provided with a gear-wheel $R^2$, in mesh with a gear-wheel $J^2$ on the main driving-shaft J. The film A after leaving the feed-wheel Q' passes in a gentle curve under an arm S, mounted to slide longitudinally on the frame C, a thumb-screw S' engaging the arm to lock the latter in place. This arm serves to prevent the film from sliding upward and for guiding it between two vertically-disposed revolving brushes T, mounted to turn loosely in suitable bearings on the frame C. The brushes are close to one side of the slide B and in alinement with the same, as plainly indicated in Fig. 1, to properly guide the film into the slide. The brushes further serve to remove any dust particles that may have settled on the film, so that the picture passes in a clean condition into the opening B' of the slide. The film after leaving the slide on the opposite side passes in a gentle curve to a sprocket feed-wheel $Q^9$, similar to the sprocket feed-wheel Q', the films being held in engagement with the sprockets of the wheel by a pressing-roller $Q^8$, mounted in the same manner as the roller Q, so that further description of the same is not deemed necessary. The film passes around the pressing-roller $Q^8$ and then winds on a reel U, removably mounted on a spindle U' by a device similar to that described in reference to the reel P. On the spindle U' is secured a grooved pulley $U^2$, connected by a crossed belt $U^3$ with a grooved pulley $U^4$ on the lower end of the shaft $Q^{11}$ for the feed-roller $Q^9$, said shaft being connected by a gear-wheel $Q^{10}$ with a gear-wheel $R^3$ on the shaft R, so that the feed-wheels $Q^9$ and Q' rotate in unison, and a like rotary motion is given to the reel U to wind up the film. The reels P and U are arranged on opposite sides of the lens-tube V, so that the device is condensed into a comparatively small space.

When the machine is in motion, the film is intermittently moved through the slide B by the action of the wheels D and D', as previously explained, the film being set on edge and passing in a horizontal direction through the slide, so that the high lights of the picture do not pass over the darker shades of the preceding picture, and consequently a perfect projection of the picture takes place.

Having thus described our invention, we claim as new and desire to secure by Letters Patent—

1. A web-feeding mechanism, provided with spaced and toothed feed-wheels mounted on independent vertical pivots for engaging the web or film at top and bottom of the slide-opening, a positive mechanism acting directly on the said wheels for imparting an intermittent rotary motion to the same, and a locking device operating in conjunction with the said feed mechanism, and engaging the said wheels at points intermediate of the points engaged by the said positive mechanism, to lock the wheels against rotation during the period of rest, substantially as shown and described.

2. A web-feeding mechanism for photographic projecting-machines, provided with a slide, a positive mechanism for intermittently feeding the film horizontally and on edge through the slide, and a pair of vertically-disposed and revoluble brushes at or near the entrance of the film to the slide and engaging the faces of the film, substantially as shown and described.

3. A web-feeding mechanism for photographic projecting-machines, provided with a slide, a positive mechanism for intermittently feeding the film horizontally and on edge through the slide, a pair of vertically-disposed and revoluble brushes at or near the entrance of the film to the slide and engaging the faces of the film, and a slidable bar adjacent to the brushes and under which the film passes to prevent the film from rising out of the brushes, substantially as shown and described.

4. A web-feeding mechanism, provided with a driven sprocket feed-roll, and a pressing-roll for giving the desired tension to the film, the said pressing-roll being journaled in a pivoted spring-pressed arm, and an adjustable stop for limiting the swinging motion of the said arm to prevent the pressing-roll from marring the film, substantially as shown and described.

5. In a photographic projecting-machine, a slide through which the film passes, consisting of a fixed member, a movable member, a ring to which the movable member is secured, a fixed and slotted tube in which the ring slides, a second ring mounted to turn on the tube and provided with a spiral slot, and a pin secured to the first-named ring and projecting into the slots of the tube and second ring, substantially as described.

6. In a web-feeding mechanism for photographic projecting-machines, the combination of spaced and toothed feed-wheels mounted on independent and vertically-alined shafts, each having two sets of notches, means for engaging one set of notches of the wheels for imparting an intermittent rotary motion to the wheels, and a locking device for engaging the other set of notches for locking the said feed-wheels against rotation during the period of rest, substantially as described.

7. In a photographic projecting-machine, the combination with a slide having an opening in the field of the lens-tube, of intermittently-rotating toothed feed-wheels mounted on independent and vertically-alined shafts at top and bottom of the slide-opening, film-reels on opposite sides of the machine, and auxiliary feed-wheels arranged on each side of the first-named feed-wheels and between the same and the reels, said auxiliary feed-wheels comprising a sprocket-wheel and a pivoted and spring-pressed guide-roller over which the film passes and by which the film is pressed upon the sprocket-wheel, substantially as described.

8. A photographic projecting-machine, comprising a slide having an opening in the field of the lens-tube, intermittently-rotating toothed feed-wheels mounted on independent and vertical shafts at top and bottom of the slide-opening, film-reels on opposite sides of the machine, auxiliary feed-wheels arranged on each side of the first-named feed-wheels, and between the same and the reels and a pair of vertically-disposed brushes between the two sets of feed-wheels and between which the film passes, substantially as described.

9. A photographic projecting-machine, comprising a slide having an opening in the field of the lens-tube, intermittently-rotating feed-wheels mounted on independent vertical shafts at top and bottom of the slide-opening, film-reels on opposite sides of the machine, auxiliary feed-wheels arranged on each side of the first-named feed-wheels and between the same and the reels, a pair of vertically-arranged brushes between the two sets of feed-wheels, and a slide-bar adjacent to the upper ends of the brushes and under which the film passes and by which the film is prevented from rising out of the brushes, substantially as described.

WILLIAM V. MILLER.
ELIAS B. DUNN.

Witnesses:
THEO. G. HOSTER,
EVERARD BOLTON MARSHALL.